(12) United States Patent
Roehrsheim et al.

(10) Patent No.: US 9,864,659 B2
(45) Date of Patent: Jan. 9, 2018

(54) SCHEDULING AND EXECUTING A BACKUP

(71) Applicant: International Business Machines Corporation, Armonk, NY (US)

(72) Inventors: Oliver Roehrsheim, Partenheim (DE); Erik Rueger, Ockenheim (DE); Tim U. Scheideler, Schoenenberg (CH); Thomas A. Snellgrove, Wakefield, MA (US)

(73) Assignee: International Business Machines Corporation, Armonk, NY (US)

( * ) Notice: Subject to any disclaimer, the term of this patent is extended or adjusted under 35 U.S.C. 154(b) by 54 days.

(21) Appl. No.: 14/936,867

(22) Filed: Nov. 10, 2015

(65) Prior Publication Data

US 2017/0132089 A1    May 11, 2017

(51) Int. Cl.
*G06F 17/30* (2006.01)
*G06F 11/14* (2006.01)

(52) U.S. Cl.
CPC .... *G06F 11/1461* (2013.01); *G06F 17/30073* (2013.01); *G06F 2201/84* (2013.01)

(58) Field of Classification Search
CPC ................................................. G06F 17/30073
USPC ....................................................... 707/654
See application file for complete search history.

(56) References Cited

U.S. PATENT DOCUMENTS

| 8,433,679 | B2 | 4/2013 | Crescenti et al. |
| 8,769,048 | B2 | 7/2014 | Kottomtharayil |
| 9,170,840 | B2* | 10/2015 | Bozek ................... G06F 9/4881 |
| 2008/0091896 | A1* | 4/2008 | Usami ................ G06F 11/1456 711/162 |
| 2008/0154979 | A1 | 6/2008 | Saitoh et al. |
| 2012/0089572 | A1 | 4/2012 | Raichstein et al. |
| 2014/0250283 | A1* | 9/2014 | Boullery ............. G06F 11/1461 711/162 |

\* cited by examiner

*Primary Examiner* — Fred I Ehichioya
*Assistant Examiner* — Johnese Johnson
(74) *Attorney, Agent, or Firm* — Schmeiser, Olden & Watts, LLP; Isaac Gooshaw

(57) ABSTRACT

Embodiments include a method and associated system and computer program product. A capacity utilization of an application system and a backup system for a first period of time is monitored, resulting in retrieving utilization statistics indicative of the capacity utilization. An application load score for the application system and a backup load score for the backup system are determined for several time slots of a backup schedule. For each time slot, a suitability score is determined, by combining the application load score and the backup load score. The suitability score is indicative of a suitability of the application system and the backup system in combination for execution of a backup during the time slot. A first time slot whose suitability score does not exceed a predefined threshold is selected. The backup is scheduled for the first time slot for the application system and for the backup system.

19 Claims, 7 Drawing Sheets

Application usage

| 6am | Appl. on Server 1 | Weight factor | |
|---|---|---|---|
| Number of application calls | 37 | 0.2 | 7.4 |
| Number of DB transactions | 80 | 0.4 | 32 |
| Number of concurrent user session | 70 | 0.2 | 14 |
| Number of currently running batch jobs | 33 | 0.2 | 6.6 |
| | | Weighted average | 60 |

Fig. 3a

Application footprint

| 6am | Server 1 | Weight factor | |
|---|---|---|---|
| CPU consumption | 40 | 0.4 | 16 |
| Disk I/O | 50 | 0.3 | 15 |
| Network I/O | 30 | 0.3 | 9 |
| | | Weighted average | 40 |

Fig. 3b

Application usage

| | 6am | 7am | 8am | 9am | 10am |
|---|---|---|---|---|---|
| Server 1 | 60 | 3 | 2 | 2 | 3 |
| Server 2 | 4 | 5 | 40 | 1 | 1 |
| Server 3 | 50 | 55 | 58 | 55 | 2 |

Application footprint

| | 6am | 7am | 8am | 9am | 10am |
|---|---|---|---|---|---|
| Server 1 | 40 | 3 | 1 | 2 | 1 |
| Server 2 | 1 | 5 | 65 | 3 | 1 |
| Server 3 | 52 | 60 | 54 | 55 | 2 |

Application usage * application footprint

| | 6am | 7am | 8am | 9am | 10am |
|---|---|---|---|---|---|
| Server 1 | 0.02 | 0.09 | 0.02 | 0.04 | 0.03 |
| Server 2 | 0.09 | 0.25 | 26.00 | 0.03 | 0.01 |
| Server 3 | 0.04 | 33.00 | 31.32 | 30.25 | 0.04 |

Backup server load 6am

| Backup server 1 | Weight factor |
|---|---|---|
| Number of concurrent backup sessions | 50 | 0.2 | 10 |
| Utilization of the buffer storage | 70 | 0.3 | 21 |
| CPU consumption | 65 | 0.2 | 13 |
| Disk I/O | 50 | 0.1 | 5 |
| Network I/O | 55 | 0.2 | 11 |
| | | Weighted average | 60 |

Fig. 4a

Backup server load

| | 5am | 6am | 7am | 8am | 9am | 10am |
|---|---|---|---|---|---|---|
| Backup server 1 | 70 | 60 | 15 | 2 | 2 | 3 |
| Backup server 2 | 55 | 4 | 5 | 2 | 1 | 1 |
| Backup server 3 | 65 | 7 | 3 | 1 | 2 | 1 |

Backup storage pool load 6am

| | Storage Pool 1 | Weight factor | |
|---|---|---|---|
| Number of concurrent backup sessions | 50 | 0.4 | 20 |
| Number of drives in use | 75 | 0.6 | 45 |
| | | Weighted average | 65 |

Fig. 4b

Backup storage pool load

| | 5am | 6am | 7am | 8am | 9am | 10am |
|---|---|---|---|---|---|---|
| Storage pool 1 | 60 | 65 | 3 | 1 | 2 | 1 |
| Storage pool 2 | 3 | 1 | 2 | 1 | 1 | 1 |
| Storage pool 3 | 70 | 55 | 15 | 1 | 2 | 2 |

Load of application server 1 - weekly schedule

| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|---|
| Mon | 81 | 77 | 66 | 56 | 58 | 5 | 1 | 5 | 67 | 5 | 60 | 68 | 60 | 69 | 64 | 62 | 60 | 65 | 67 | 8 | 0 | 3 | 5 | 5 |
| Tue | 3 | 1 | 8 | 3 | 2 | 0 | 9 | 0 | 2 | 7 | 65 | 68 | 64 | 63 | 62 | 61 | 68 | 65 | 5 | 5 | 3 | 8 | 1 | 9 |
| Wed | 7 | 0 | 6 | 3 | 9 | 1 | 8 | 8 | 64 | 67 | 65 | 69 | 69 | 67 | 64 | 67 | 65 | 68 | 66 | 9 | 2 | 5 | 3 | 7 |
| Thu | 3 | 3 | 4 | 7 | 0 | 1 | 0 | 7 | 62 | 69 | 62 | 60 | 60 | 67 | 63 | 66 | 65 | 61 | 61 | 6 | 4 | 0 | 8 | 2 |
| Fri | 0 | 3 | 2 | 0 | 2 | 1 | 0 | 9 | 58 | 68 | 61 | 67 | 1 | 1 | 1 | 1 | 69 | 68 | 65 | 5 | 4 | 8 | 2 | 9 |
| Sat | 0 | 2 | 3 | 3 | 1 | 5 | 0 | 4 | 3 | 0 | 7 | 5 | 6 | 4 | 3 | 3 | 0 | 9 | 2 | 4 | 9 | 2 | 0 | 9 |
| Sun | 2 | 2 | 3 | 5 | 1 | 1 | 1 | 0 | 8 | 7 | 0 | 1 | 0 | 4 | 7 | 7 | 3 | 1 | 82 | 82 | 80 | 77 | 82 | 76 |

Fig. 5a

Load of backup server 1 - weekly schedule

| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|---|
| Mon | 75 | 71 | 74 | 60 | 57 | 44 | 32 | 3 | 8 | 9 | 4 | 1 | 5 | 2 | 6 | 8 | 1 | 2 | 6 | 4 | 69 | 76 | 70 | 76 |
| Tue | 79 | 73 | 70 | 65 | 52 | 41 | 36 | 7 | 5 | 6 | 1 | 9 | 1 | 4 | 9 | 0 | 2 | 3 | 7 | 3 | 62 | 72 | 76 | 75 |
| Wed | 79 | 72 | 77 | 61 | 59 | 48 | 20 | 12 | 65 | 3 | 7 | 8 | 2 | 4 | 1 | 1 | 4 | 7 | 8 | 35 | 60 | 79 | 76 | 72 |
| Thu | 79 | 74 | 78 | 63 | 59 | 42 | 37 | 13 | 68 | 70 | 72 | 2 | 3 | 2 | 5 | 5 | 7 | 8 | 2 | 7 | 35 | 38 | 41 | 76 |
| Fri | 79 | 48 | 15 | 11 | 17 | 10 | 15 | 76 | 78 | 3 | 9 | 0 | 9 | 0 | 8 | 3 | 8 | 3 | 5 | 3 | 65 | 68 | 71 | 73 |
| Sat | 78 | 73 | 76 | 65 | 53 | 46 | 34 | 11 | 5 | 75 | 6 | 9 | 0 | 0 | 2 | 3 | 2 | 5 | 5 | 2 | 69 | 78 | 72 | 79 |
| Sun | 78 | 70 | 79 | 68 | 54 | 46 | 15 | 7 | 13 | 10 | 8 | 4 | 5 | 3 | 5 | 6 | 9 | 4 | 4 | 0 | 60 | 73 | 75 | 75 |

Fig. 5b

Time slot evaluation for application server 1 and backup server 1

| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|---|
| Mon | 156 | 148 | 140 | 116 | 115 | 49 | 33 | 8 | 75 | 14 | 64 | 69 | 65 | 71 | 70 | 70 | 61 | 67 | 73 | 12 | 69 | 79 | 75 | 81 |
| Tue | 82 | 74 | 78 | 68 | 54 | 41 | 45 | 7 | 7 | 13 | 66 | 77 | 65 | 67 | 71 | 61 | 70 | 72 | 12 | 8 | 65 | 80 | 77 | 84 |
| Wed | 86 | 72 | 83 | 68 | 68 | 49 | 28 | 12 | 65 | 70 | 72 | 77 | 71 | 73 | 68 | 68 | 69 | 76 | 74 | 44 | 62 | 84 | 79 | 79 |
| Thu | 82 | 77 | 82 | 63 | 61 | 43 | 37 | 13 | 68 | 78 | 63 | 62 | 70 | 65 | 71 | 71 | 72 | 58 | 63 | 13 | 39 | 38 | 41 | 78 |
| Fri | 79 | 51 | 17 | 12 | 12 | 22 | 10 | 15 | 76 | 75 | 62 | 68 | 1 | 1 | 9 | 9 | 77 | 71 | 70 | 8 | 65 | 76 | 49 | 82 |
| Sat | 78 | 75 | 79 | 68 | 62 | 46 | 38 | 5 | 13 | 1 | 13 | 14 | 6 | 6 | 6 | 2 | 14 | 5 | 7 | 6 | 69 | 78 | 73 | 88 |
| Sun | 80 | 72 | 82 | 73 | 55 | 47 | 16 | 7 | 13 | 10 | 8 | 5 | 0 | 7 | 12 | 13 | 12 | 5 | 86 | 82 | 140 | 150 | 157 | 151 |

Fig. 5c

SCHEDULING AND EXECUTING A BACKUP

TECHNICAL FIELD

The present invention relates to a method for scheduling and executing a backup in a data processing system that includes an application system and a backup system.

BACKGROUND

Solutions for backup of application data are usually application integrated which means the solutions deal with the management of potential temporary application outages for backup purposes.

In addition, backup solutions usually offer options to define a backup schedule regarding when to perform the backup. Such a schedule usually includes static date and time definitions, either once in the future (e.g., next week Sunday at 3 am) or based on a recurring interval (e.g., every Sunday at 5 am).

SUMMARY

An embodiment of the present invention provides a method.

The method monitors, by one or more processors of a computer system, a capacity utilization of an application system and of a backup system of a data processing system for a predefined first period of time. The monitoring results in retrieving utilization statistics indicative of a capacity utilization of the application system and of the backup system.

The method determines, by the one or more processors, for several time slots of a backup schedule, an application load score for the application system and a backup load score for the backup system, by applying a predefined metric to the retrieved utilization statistics of the application system and of the backup system. The application load score and the backup load score are indicative of an expected load of the application system and of the backup system, respectively, during each time slot of a plurality of time slots. Each time slot is defined by a starting time and a time duration relative to the starting time.

The method determines, by the one or more processors, for each time slot, a suitability score, by combining the application load score and the backup load score. The suitability score is indicative of a suitability of the application system and of the backup system in combination for execution of a backup during the time slot. The backup comprises copying data elements from the application system to the backup system.

The method selects, by the one or more processors, for the backup, a first time slot, from the plurality of time slots, whose suitability score does not exceed a predefined threshold.

The method schedules, by the one or more processors, the selected backup for the first time slot for the application system and for the backup system.

The present invention also provides embodiments of a computer program product comprising program code executable by one or more processors to implement the preceding method.

The present invention also provides embodiments of a computer system comprising one or more computer readable hardware storage devices containing program code executable by one or more processors via one or more memories to implement the preceding method.

BRIEF DESCRIPTION OF THE DRAWINGS

The following embodiments of the invention are explained in greater detail by way of example only making reference to the drawings.

FIGS. 3a and 3b depict tables describing the determination of load scores for an application system, in accordance with embodiments of the present invention.

FIGS. 4a and 4b depict tables describing a determination of load scores for a backup system, in accordance with embodiments of the present invention.

FIGS. 5a, 5b and 5c depict tables describing a determination of a suitability score of a timeslot, in accordance with embodiments of the present invention.

DETAILED DESCRIPTION

Figure 1:
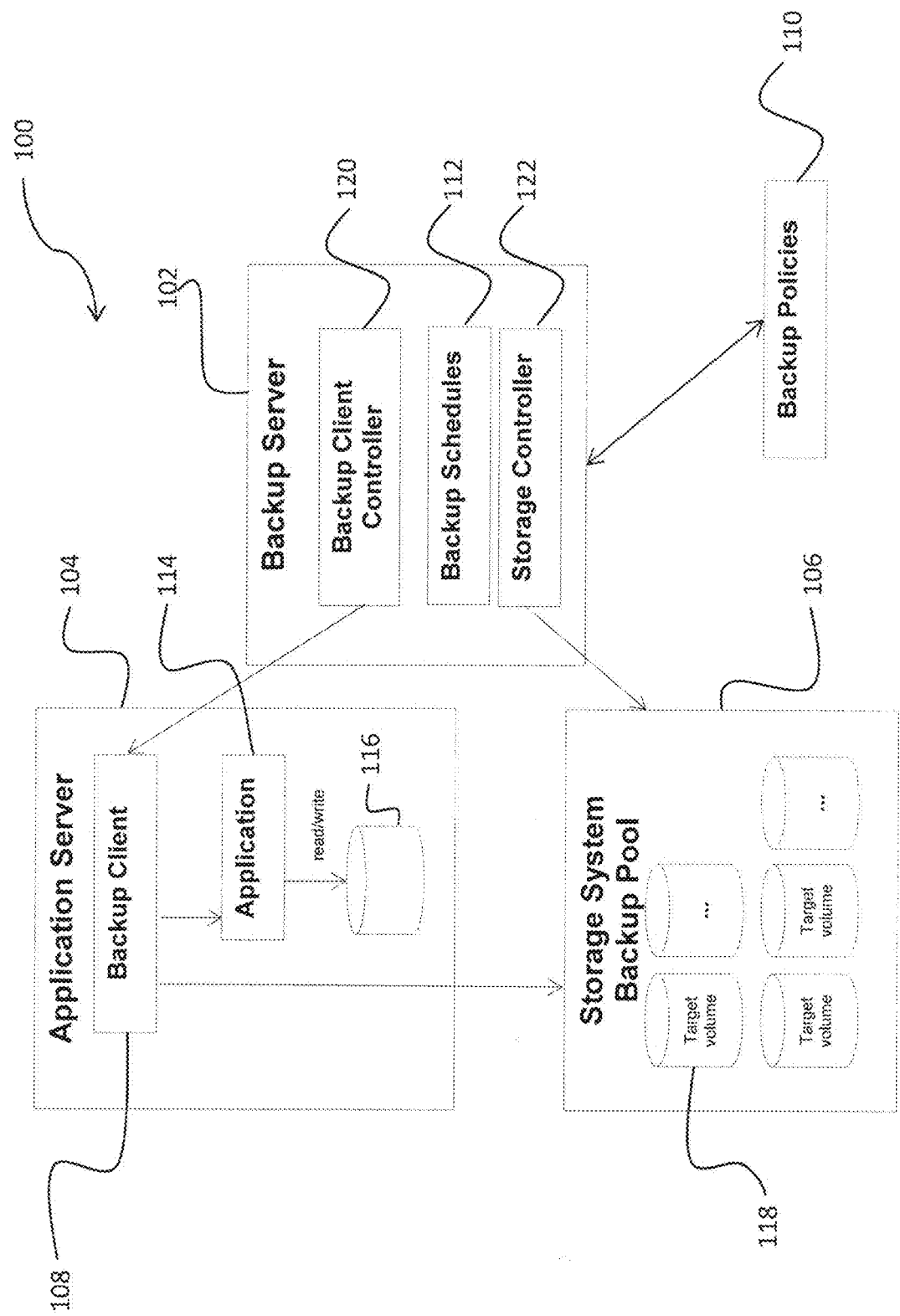
FIG. 1 depicts a schematic of a data processing system as known in the prior art.

The present invention provides embodiments pertaining to an improved computer implemented method for executing a backup, the method comprising copying of data elements from an application system to a backup system of a data processing system in accordance with a backup schedule in the data processing system. The present invention also provides embodiments pertaining to a corresponding computer program product and an apparatus for executing a backup via a method, the method comprising copying of data elements from an application system to a backup system of a data processing system in accordance with a backup schedule.

An embodiment of the present invention relates to a computer implemented method for executing a backup, the method comprising copying of data elements from an application system to a backup system of a data processing system in accordance with a backup schedule in the data processing system. The backup schedule comprises information on a plurality of predefined timeslots for execution of the backup. The timeslots are defined by a starting time point and a duration.

The method comprises monitoring a capacity utilization of the application system and the backup system for a predefined first period of time for retrieving utilization statistics indicative of the capacity utilization of the application system and the backup system.

By applying a predefined metric to the retrieved utilization statistics of the application system and the backup system, an application load score for the application system and a backup load score for the backup system are determined for several timeslots of the backup schedule. The application load score and the backup load score are indicative of the expected load of the application system and the backup system during each timeslot.

By combining the application load score and the backup load score, a suitability score is determined for each time slot, the suitability score being indicative of the suitability of the application system and the backup system for execution of the backup during a timeslot. In response to the suitability score of the timeslots having been determined, a first timeslot for the backup is selected from a plurality of timeslots, the first timeslot having a suitability score which satisfies a predefined threshold. Definitionally, a suitability score satisfying a predefined or predetermined threshold means that the suitability score does not exceed the predefined or predetermined threshold. The backup is then scheduled for the first timeslot for the application system and the backup system.

In response the starting time point of the time slot of the backup being reached, the backup is executed by copying the corresponding data elements from the application system to the backup system.

Embodiments of the present invention relate to a computer program product comprising machine-executable instructions for performing the method as described above.

Embodiments of the present invention relate to an apparatus for executing a backup. The apparatus implements a method, the method comprising copying data elements from an application system to a backup system of a data processing system in accordance with a backup schedule of a data processing system. The backup schedule comprises information on a plurality of predefined timeslots for execution of the backup. The timeslots of the schedule are defined by a starting time point and a duration, wherein the apparatus is configured to:

monitor a capacity utilization of the application system and of the backup system for a predefined first period of time for retrieving utilization statistics indicative of the capacity utilization of the application system and of the backup system;

determine for several time slots of the backup schedule, an application load score for the application system and a backup load score for the backup system, by applying a predefined metric to the retrieved utilization statistics of the application system and the backup system, the application load score and the backup load score being indicative of an expected load of the application system and of the backup system during each of the time slots;

determine for each of the time slots, a suitability score by combining the application load score and the backup load score, the suitability score being indicative of a suitability of the application system and of the backup system for execution of the backup during the time slot;

select for the backup a first time slot from the plurality of time slots whose suitability score satisfies a predefined threshold;

schedule the backup for the first time slot for the application system and for the backup system; and execute the backup.

A "backup system" herein may comprise a backup server and a plurality of backup storage entities, which may be described as a backup storage pool. As such, the backup server may be any kind of computer system comprising at least a central processing unit, a hardware data storage medium (or hardware storage device) and a network interface. The backup server may be operatively coupled to the backup storage pool for managing the execution of the backup. The backup storage pool may comprise a plurality of entities capable of storing data elements. Thus, the backup storage pool may, for example, comprise a plurality of tape storages, hard disks, solid state disks, etc. and is adapted to physically store the backed up data.

An "application system" herein may comprise any kind of computer system, comprising at least a central processing unit, a hardware data storage medium (or hardware storage device) and a network interface. The application system may further comprise an application installed and run on the computer system.

A "data element" herein is a data element of the application system, which is, for example, created, modified or retrieved for further processing during execution of an application on the application system. Thus, the data elements are application specific data. The application specific data is saved, by copying the data elements from the application system to a data storage of a backup system during execution of a backup.

A "time slot" herein is a time window, defined by a starting time and a time duration. A starting time may be a time of day without specifying the day itself, or may further comprise a day of a week or even a defined date. For example, it may be possible to define timeslots on a weekly schedule by subdividing the 24 hours of each day into time windows having a temporal length (duration) of 1 hour. As a result, each day of the week comprises 24 time slots. A time slot may thus be defined by the statement "Monday, 3 pm, 1 h". When scheduling a backup for a time slot, it may further be possible to specify not only the date and time of the backup, but also the backup system and the application system which are involved in the execution of the backup. In one embodiment, if there are a plurality of backup systems and application systems, then during a single time slot, a plurality of backups may be scheduled. Thus, the date and time, and also the involved backup system and application system, may be incorporated into a time slot.

A predefined threshold, which is to be satisfied when scheduling the backup, may be chosen in accordance with scheduling criteria of the backup. For example, the scheduling criteria may comprise information indicative of a necessary bandwidth of the backup or application system during execution of the backup in order to satisfy a predetermined backup performance. As the suitability scores of a time slot incorporate information on the expected performance of the backup and application system, the threshold for the suitability score can be chosen accordingly. For example the suitability scores may be determined and normalized such that a suitability score may have a value between 0 and 100. Herein a suitability score of 0 may indicate that the corresponding timeslot is perfectly suitable for execution of a backup, as the corresponding backup and application system are expected to have minimal load. Accordingly a load score of 100 may indicate, that the time slot is not suited for any backup as the backup and application system are expected to have a very high load making further load by execution of a backup impossible. The threshold may, for example, be defined as a suitability score of 30. Thus time slots having a suitability score of 30 or less can be used for scheduling the backup, while time slots having a suitability score of more than 30 should be neglected.

Embodiments of the present invention have an advantage that the scheduling of the backup can dynamically be adapted to expected load levels of the data processing entities which are involved in the backup process. Further, in one embodiment, estimating the load of the involved entities considers both the application infrastructure and the backup infrastructure. Thus, an execution of a backup involving a backup system or an application system, which is currently not capable of performing a backup or providing a required level of backup performance, can be prevented.

Further embodiments may have an advantage that the backup schedule may be improved repeatedly for every single backup to be scheduled. This advantage may incrementally lead to a backup schedule which will be best adapted to the infrastructure of the data processing system. If parts of the data processing system are altered, for example, because a new backup storage is added to the backup system, then a new execution of the method will again yield a backup which is adapted to capabilities of the modified data processing system, which also applies if new backup routines are incorporated into the backup schedule.

In some embodiments, the backup has assigned scheduling conditions, the scheduling conditions being indicative of a starting time point and a second period of time for execution of the backup. The selected first time slot may fall within a time frame given by the starting time and the second period of time. For example, a certain backup may be executed between 3 am and 5 am. Further, the backup may be executed on a certain day of the week, for example only on Mondays. When scheduling the backup, these scheduling conditions have to be satisfied.

In some embodiments, the scheduling utilizes a scheduling criterion. The method may comprise sorting the backups in accordance with the scheduling criterion, the sorting resulting in a list of backups. In one embodiment, the method may comprise sorting the time slots of the backup schedule in accordance with the suitability scores of the time slots in descending order, the sorting resulting in a list of time slots. Selecting a time slot for the backup may comprise selecting a time slot from the list of time slots for a corresponding backup from the list of backups. For example, a scheduling criterion may be a scheduling flexibility which may indicate whether a backup has to be scheduled during the second period of time, or whether the backup may also be scheduled for some time before or after the second period of time.

For example, the flexibility of a backup could be described with four levels. If the flexibility is set to "none", the backup has to be scheduled during the second period of time and it is not possible to make exceptions, which may, for example, apply if a backup of an application can only be conducted if the application is not used by any customers for a predetermined time period. If the flexibility is set to "low", the backup is preferentially executed during the second period of time, even if the corresponding suitability score of the time slots is determined to be high. However in one embodiment, if the corresponding suitability scores are beyond a predefined threshold, the backup may be scheduled for a time slot which does not fall into the second period of time. If the flexibility is set to "medium", both the backup time window and the suitability scores of the corresponding time slots are considered. If the flexibility is set to "high" the backup can be scheduled in accordance with the suitability scores of the time slots without consideration of the backup time window. In one embodiment, the list of backups may start with backups having the flexibility "none" and end with backups having the flexibility "high"

In some further embodiments, a scheduling criterion of backups in the list of backups is the respective length of a time period of the backups. The backups in the list are sorted in descending order of the corresponding length of the time period. Consider, for example, a set of three backups which are to be scheduled. The first backup has no scheduling criterion and the second backup has a scheduling criterion that the second backup may only be executed between 5 am and 7 am. The first backup may be scheduled at 6 am, because the suitability score of the corresponding time slot has been determined to be lowest for all hours of the day. Scheduling of the second backup may be difficult, especially if the time slot starting at 5 am has been determined to have a very high suitability score, indicating that the time slot starting at 5 am is not well suited for scheduling a backup. If, however, the second backup is scheduled first, the time slot at 6 am can be selected for scheduling the second backup. The first backup may then be scheduled for one of the remaining time slots, wherein it is very likely that there will be another time slot which has an assigned suitability score that is almost as low as the suitability score for the time slot at 6 am. As a result, both the first backup and the second backup can be scheduled with time slots having a low suitability score.

In some embodiments, each time slot of the backup schedule has a same duration (for example, 1 hour). In one embodiment, the backup has a duration exceeding the duration of a single time slot and the method comprises defining a set of sequences of consecutive time slots such that the sum of the durations of the consecutive time slots within each sequence matches or exceeds the duration of the backup. For the set of sequences, cumulative suitability scores per sequence are determined using the individual suitability scores of the time slots within the respective sequence. The selecting of the first time slot comprises the selecting of the sequence of time slots having a cumulative suitability score which satisfies a predefined threshold condition.

Embodiments of the present invention have the advantage, that, the suitability scores which have been determined for time slots have a predefined duration. For example, 1 hour may also be used for scheduling backups which will have a runtime exceeding the duration of a single time slot. As a result, the granularity of the time slots may be adapted to the runtime of the backups to be scheduled, for example, by determining the greatest common divisor (GCD) of the runtimes of the backups to be scheduled as the duration of a single time window. As a result, the number of timeslots necessary for scheduling a backup can be adapted to the runtime of a backup.

In some embodiments, the method further comprises determining if the backup has to be scheduled repeatedly, such as, for example, on a daily or weekly basis. In case the backup has to be scheduled repeatedly, the time slot of the most recent execution of the backup is determined. The first time slot is then selected such that the time distance between the time slot of the most recent execution of the backup and the first time slot does not exceed a predefined threshold. Embodiments may, for example, be beneficial for backups which have to be scheduled such that the time between two executions of a backup does not exceed a certain time distance as specified by corresponding service level agreements (SLAs).

In some embodiments, the monitoring of the capacity utilization of the application system and the backup system further comprises detection of patterns in the temporal distribution of the capacity utilization for periods of time of predefined temporal length. The retrieving of the utilization statistics comprises comparing a first pattern of the temporal distribution of the capacity utilization for a first period of time with a second pattern of the temporal development of the capacity of a second period of time. If the deviation between the first pattern and the second pattern exceeds a predefined threshold, the monitored capacity utilization of the first period of time is discarded, and the monitored capacity utilization of the second period of time is also used for determining the application load score and backup load score for the first period of time, wherein the second period of time temporally precedes the first period of time.

Embodiments of the present invention have the advantage that, for example, an oscillating behavior in the scheduling of the backups can be prevented. Consider, for example, a data processing system initially comprising only a single backup storage pool. At some point in time, a second backup storage pool is added to the data processing system. When monitoring the utilization of the second backup storage pool during a second period of time, it will be determined that the second backup storage pool is perfectly suited for executing backups. As a result, it may occur that a huge number of backups are scheduled for this second backup storage pool, leading to an underutilization of the first storage backup pool. In a next first monitoring period of time, the same behavior might occur with switched roles of the first and second backup storage pool leading to an oscillation of load between the two backup storage pools, which may be overcome by introducing a threshold which will, for example, lead to a discarding of the detected pattern for the first period of time.

In some embodiments, the data processing system comprises a plurality of the application systems and a plurality of the backup systems. The determining of the application load score and the backup load score is then executed individually for each application system of the plurality of application systems and backup systems. The determination of the suitability scores is performed for each combination of application system and backup system for the time slots.

Embodiments of the present invention have the advantage that even for a plurality of backup systems and application systems, the best time slot for execution of a backup can be determined. If, for example, the data processing system comprises 20 application systems and 20 backup systems, there are 400 combinations of backup systems and application systems which can be reviewed regarding suitability for execution of a backup.

In some embodiments, the backup system comprises at least one backup server and at least one backup storage pool, the backup server being adapted to trigger the execution of the plurality of backups in accordance with the backup schedule and the backup storage pool comprising data storage for storing the data elements of the application system during execution of the backup. The monitoring of the capacity utilization of the backup system comprises (i) monitoring the capacity utilization of the at least one backup server to retrieve backup server utilization statistics and (ii) monitoring the capacity utilization of the at least one backup storage pool to retrieve backup storage pool utilization statistics. The determination of the backup load score comprises determining a backup server load score by applying a first predefined metric to the retrieved backup server utilization statistics, determining a backup storage pool load score by applying a second predefined metric to the retrieved backup storage pool utilization statistics, and determining the backup load score by combining the backup server load score and the backup storage pool load score. By monitoring the backup server and the backup storage pool individually, the corresponding load score of the backup system may become more significant. As the utilization statistics are gathered for both the backup server and the backup storage pool, the corresponding metrics for determining the corresponding load scores may be defined such that characteristics which are considered to be important can be emphasized.

In some embodiments, the application system comprises at least one application server and at least one application executed on the application server. The monitoring of the capacity utilization of the application system comprises (i) monitoring the capacity utilization caused by execution of the at least one application on the corresponding application server to retrieve application server utilization statistics, and (ii) monitoring the application usage of the at least one application to retrieve application usage statistics. The determination of the application load score then comprises determining an application server load score by applying a third predefined metric to the retrieved application server utilization statistics, determining an application usage score by applying a fourth predefined metric to the retrieved application usage statistics, and determining the application load score by combining the application server load score and the application usage score.

Embodiments of the present invention have the advantage that by monitoring both the application server and the application itself, the significance of the load score and the corresponding suitability scores can be further increased. As such, it may, for example, occur that the application server has a low load level, while the application affected by the backup process is used very frequently or is currently running a routine which shall not be interrupted by the backup process. The preceding embodiments can be reflected in a corresponding application usage score by defining the metric for determining the application usage score accordingly.

In some embodiments, the method further comprises selecting for the backup a second time slot from the plurality of time slots, the second time slot having a suitability score which satisfies the predefined threshold, and storing information indicative of the second time slot. Prior to execution of the backup, the method further comprises determining whether the application system and/or backup system of the first time slot is available, and if the application system and/or backup system is not available, executing the backup at the second time slot.

Embodiments of the present invention have the advantage, that if the backup system and/or the application system experience an unexpected high load at the time a backup is to be executed, it is not necessary to determine a new time slot for the backup but rather to read the second time slot which has previously been determined and schedule the backup for the second time slot. As such, a whole second backup schedule for the plurality of backups may be created, the second backup schedule comprising second backup slots for the plurality of backups.

FIG. 1 shows a schematic of a data processing system 100 as known in the prior art. The data processing system 100 comprises a backup server 102, an application server 104 and a storage system backup pool 106. The backup server 102 controls the backup client 108 in the application server 104 as defined in the corresponding backup policies 110 and the backup schedules 112 in the backup server 102. The backup is directed towards the backup of application specific data of an application 114 which is executed on the application server 104. During execution of the application 114, the application 114 stores and retrieves data in a local storage medium 116 of the application server 104. Thus in order to perform a backup, the application specific data stored in the storage medium 116 of the application server 104 is stored in data storage media 118 in the storage system backup pool 106.

Storing of application specific data in the storage system backup pool 106 is performed by the backup client 108. The backup client 108 interfaces with the application 114, receives the application specific data from the storage medium 116 and stores the application specific data in the backup pool 106. The backup server 102 is configured to coordinate the backup of application specific data and comprises (i) a backup client controller 120 which interfaces with the backup client 108 of the application server 104 and (ii) a storage controller 122 which interfaces with the storage system backup pool 106.

Figure 2:
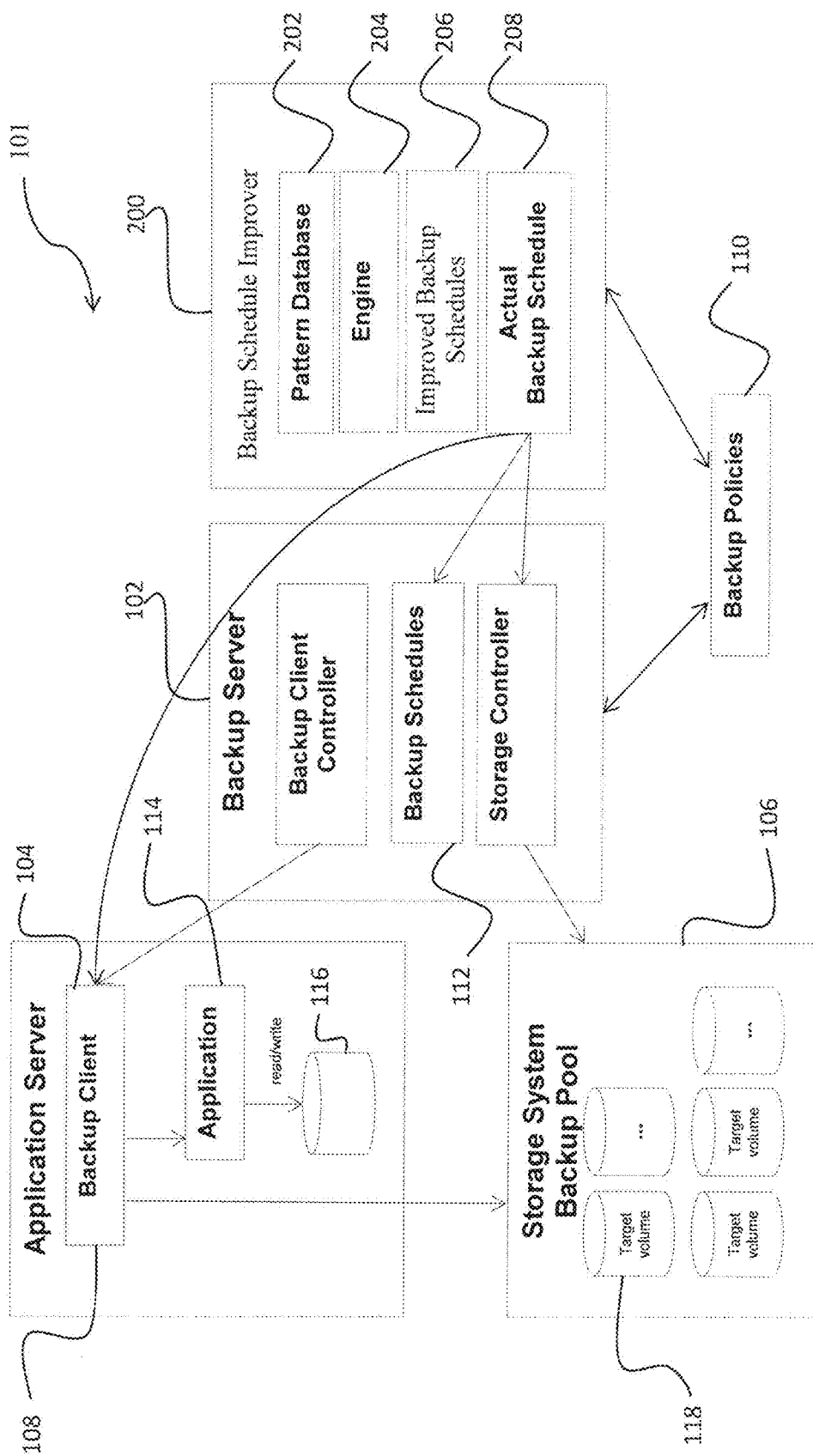
FIG. 2 depicts a schematic of a data processing system, in accordance with embodiments of the present invention.

FIG. 2 is a schematic of a further data processing system 101, in accordance with embodiments of the present invention. The data processing system 101 depicted in FIG. 2 comprises the backup server 102, the application server 104 and the storage system backup pool 106 in common with the data processing system 100 depicted in FIG. 1. The data processing system 101 of FIG. 2 further comprises a backup schedule improver 200. The backup schedule improver 200 can be a module which is connectable to the backup server 102. It is also possible to design the backup schedule improver 200 as a computer program product comprising program code which can be run on the backup server 102. The backup schedule improver 200 is configured to improve a backup schedule 112 in the backup server 102. The backup schedule improver 200 comprises: (i) a pattern database 202 comprising load patterns of the backup server 102, application server 104 and the storage system backup pool 106 and (ii) an engine 204 which is configured to use data in the pattern database 202 to determine an improved backup schedule 206. The actual backup schedule 208 is derived from the improved backup schedules 206. For example, the actual backup schedule 208 may deviate from the improved backup schedule 206 because of current events such as an unexpected outage of the storage system backup pool 106 or an unexpected high load level of the application server 104, the backup server 102 and/or the storage system backup pool 106.

In order to retrieve data necessary to establish the patterns stored in the pattern database 202, the backup schedule improver 200 is configured to monitor the capacity utilization of the backup server 102, the application server 104 and the storage system backup pool 106 to retrieve utilization statistics. Using the utilization statistics, the engine 204 of the backup schedule improver 200 determines load scores of the backup server 102, the application server 104 and the storage system backup pool 106 as will be described infra. From the load scores, a suitability score for a certain time slot of a backup schedule is determined. Using the suitability scores, the backup schedules 206 are improved as will be described infra.

The actual backup schedule 208, which is based on the improved backup schedule 206, may, for example, be transferred to the backup server 102 in order to replace the backup schedule 112 of the backup server 102. The backup server 102 may then trigger the backups corresponding to the stored backup schedule 112. It is further possible in one embodiment, that the backup schedule improver 200 triggers backups in accordance with the actual backup schedule 208 by addressing the backup client 108 of the application server 104 directly.

The following description describes how the data in the pattern database 202 is determined and how the engine 204 of the backup schedule improver 200 converts the collected data of the pattern database 202 into suitability scores which serve for the determination of the improved backup schedule 206.

FIGS. 3a and 3b depict respective tables describing how a measure for the capacity utilization of the application server 104 and a measure for the capacity utilization of the application 114 may be determined, in accordance with embodiments of the present invention.

Determining the capacity utilization of the application server 104 and of the application 114 comprises defining (i) a number of parameters in FIG. 3a which can be measured with regards to the utilization of the application 114 and (ii) a number of parameters in FIG. 3b which can be measured with regards to the utilization of the application server 104. In order to quantify the utilization of the application 114 as in FIG. 3a, it may, for example, be possible to monitor the number of application calls, the number of database transactions caused by the application 114, the number of concurrent user sessions of the application 114 and/or the number of currently running batch jobs of the application 114 over a predetermined period of time. For example, it may be possible in one embodiment to collect statistics determining the parameters in FIG. 3a over a period of one hour for example, starting at 6 am on a specified day (Monday, Tuesday, etc.) in a week.

In order to convert the parameters in FIG. 3a into an application load score, a metric for processing the parameters of FIG. 3a may be defined. For example, it may be possible to define weight factors for each of the data categories in which statistics for the parameters of FIG. 3a have been collected. In the example depicted in FIG. 3a, the number of application calls, the number of concurrent user sessions and the number of currently running batch jobs have a weighting factor of 0.2, and the number of database transactions has a weighting factor of 0.4. As a result, a weighted average over all the statistics collected over the predefined period of time can be determined. The resulting overall value of the application usage may then be used as an application load score. In FIG. 3a, an application load score of 60 has been determined, which is stored in a corresponding entry of a table describing the application usage over a time period (e.g., one hour). By monitoring the described statistics for each hour of the day, a table comprising an application load score for every hour of the day can be determined. This monitoring the described statistics may, for a plurality of application servers 104, be performed for each server individually for each hour of the day as indicated in FIG. 3a.

Similarly, the utilization of the application server 104 caused by execution of the application 114 may be determined. In one embodiment, the load of the application server 104 caused by the backup process is not considered when determining the capacity utilization statistics of the application server 104.

In the example depicted in FIG. 3b, there are three categories for which statistics are collected: the CPU consumption caused by execution of the application 114, the input/output operations of the storage medium 116 caused by execution of the application 114 as well as the input/output operations of a network interface of the application server 104 caused by the application 114. For each of the preceding three categories, a weighting factor is defined such that a weighted average over all collected data can be determined. In FIG. 3b, the weighted average has been determined to be 40. In one embodiment, the determined value of 40 is then transferred into a corresponding table comprising the load scores of the application server 104 or a plurality of application servers for each hour of the day.

In order to determine an overall application system load score it is possible to combine the tables in FIGS. 3a and 3b respectively comprising the individual load scores of the application and of the application server, for example, by multiplying and scaling the corresponding entries of the tables in FIGS. 3a and 3b, which results in a table comprising a load score of the application system or the plurality of application systems for each hour of the day. It may also be possible to increase or decrease the granularity of data collection, for example, by reducing the measurement time interval to 30 minutes or expanding the measurement time to 2 hours, respectively. In one embodiment, peaks in the load of the application system may not be detected due to an averaging effect. In one embodiment, decreasing the length of the measurement time interval may yield an increased resolution of the load statistics of the application system, yet increasing the processing load for determining the statistics and load scores.

FIGS. 4a and 4b depict tables describing how the load score of the backup server 102 and the storage system backup pool 106 may be determined, in accordance with embodiments of the present invention.

FIG. 4a depicts five categories for which utilization statistics of the backup server 102 are determined, namely the categories of: the number of concurrent backup sessions, the utilization of the buffer storage of the backup server 102, the CPU consumption, the number of disk input/output operations, and the number of network operations. For each of these five categories, a weighting factor is defined and a weighted average over all five categories is determined. The determined value of the load score of the backup server 102 is then stored in a corresponding table comprising the load scores of the backup server 102 for predetermined time periods.

FIG. 4b depicts two categories for which utilization statistics are determined on behalf of the backup storage pool 106, namely the categories of: concurrent backup sessions and the number of drives 118 of the storage system backup pool 106 in use. The determined weighted average values are stored in a table indicative of the utilization of both the backup storage pool and the backup server over predefined periods of time.

The categories for which statistics are collected as described with reference to FIGS. 3a and 3b as well as FIGS. 4a and 4b are mere examples. Other criteria or categories may be defined depending on the backup and application infrastructure of the data processing system 101. In one embodiment, the data used for determining the load scores of the backup server 102, the backup storage pool 106 and the application server 104 may be collected by the backup schedule improver 200. Either the backup schedule improver 200 retrieves the data from the application server 104, the backup server 102 and the storage system backup pool 106 or the backup server 102, the application server 104 and the storage system backup pool 106 forward corresponding utilization statistics to the backup schedule improver 200.

In one embodiment, not only the last measurement is entered into the tables comprising the load scores, but the tables also comprise historic data, so that a cutoff parameter may be set in order to define at which point historic measurements are outdated. In one example, only the last ten measurements are considered. A weighted average over the measurements is taken and, in one embodiment, more weight is given to recent measurements.

When scheduling backups, the corresponding backup policies 110 as well as corresponding service level agreements (SLAs) have to be adhered to. A backup policy 110 may, for example, comprise information indicative of the backup frequency (for example, daily, weekly or monthly backups, a backup time window such as 1 am to 4 am on Sunday or always the first day of the month) and a level of flexibility. The level of flexibility may indicate if a backup is to be executed during a specified backup time window or whether it is possible to deviate from the specified backup time window, as specified in the backup policy 110.

The scheduling of backups may further have to obey service level agreements which may be expressed, in one embodiment, by two parameters. The first parameter is the recovery point objective (RPO) which determines the maximum period in which data can be lost. The recovery point objective restricts the time period of a backup interval plus a backup duration. Imminent violations of a recovery point objective would trigger a backup execution. For example, load considerations as described below may suggest to schedule a weekly backup in the first week on Monday, and in the second week on Saturday. However, the recovery point objective may be set to ten days. Thus in the second week the backup schedule improver 200 must schedule the backup no later than Wednesday.

The second parameter is the recovery time objective, which expresses the maximum time span used for service restoration. Depending on the data volume, the backup environment may ensure suitable restore performance, for example expressed per gigabyte per hour such that the backup schedule improver 200 selects the appropriate backup medium depending on the recovery time objective, volume, restore performance and load.

In response to the backup schedule improver 200 selecting a backup for scheduling, the backup schedule improver 200 first estimates the backup runtime from the data scope of the backup and infrastructure performance of the infrastructure involved in the backup. A weekly schedule may be considered for which the backup schedule improver 200 tries to find the best fitting timeslot of the backup schedule for application server 108 as described with reference to FIG. 3 and the backup server 102 as described with reference to FIG. 4.

FIGS. 5a and 5b depict tables comprising individual load scores of the application server 108 and the backup server 102 for a complete week, in accordance with embodiments of the present invention. Each day of the week is sub-divided into 24 timeslots corresponding to the 24 hours of the day. For each of the timeslots a load score has been determined as described with reference to FIGS. 3 and 4. The load score may, for example, reflect an expected load of the application server 108 or the backup server 102 for the timeslot based on historic measurements.

In order to find the best timeslot for scheduling of a backup, a combined load score table (comprising a suitability score) for the application server 108 and the backup server 102 is determined as illustrated in FIG. 5c, in accordance with embodiments of the present invention. Such a combined load score table in FIG. 5c is determined, for example, by adding the individual entries of the timeslots for the load of the application server 108 as shown in FIG. 5a and the load of the backup server 102 as shown in FIG. 5b to compute the suitability score for Table 5c.

Prior to selecting a time slot for scheduling a backup, the expected runtime of the backup process is determined. In order to determine the backup runtime, the runtime may be estimated if the backup has never been executed before on the data processing system 101. If the backup has been executed before, the backup runtime can be estimated from the last runs under consideration of previous and current loads of both the application server 108 and the backup server 102.

If the backup to be scheduled has no corresponding conditions concerning a time window for execution of the backup and if the backup is assumed to have a duration of not more than one hour, then the backup would, for example, be scheduled for Sunday at 12 pm, since the entry of zero (0) in the table in FIG. 5c indicates that the application system 108 and the backup system 102 are expected to have no load at all.

As another example, if the same backup should be scheduled between 2 am and 5 am, then the backup with one hour duration would be scheduled for Friday at 3 am or 4 am wherein the minimum suitability score of 12, between 2 am and 5 am, is shown in the table in FIG. 5c.

As yet another example, if a backup to be scheduled will have a runtime of three hours, then a sequence of three consecutive timeslots with the lowest suitability score is determined from the table in FIG. 5c, by summing up the individual suitability scores of the time slots in the sequence. For example assume that the backup having a runtime of 3 hours shall be scheduled between 3 am and 5 am. The corresponding suitability score is 180 for Monday, 163 for Tuesday, 185 for Wednesday, 167 for Thursday, 46 for Friday, 176 for Saturday and 175 for Sunday. As a result, the backup would be scheduled Friday between 3 am and 5 am, since the corresponding load score of the application system and the backup system is very low (46) as compared with the remaining days of the week.

The approach described above may be utilized in a data processing system comprising a plurality of backup systems and a plurality of application systems. Further, a single backup system may comprise a plurality of backup servers and/or a plurality of storage system backup pools. Utilization statistics may be collected for the plurality of backup servers and storage system backup pools as well as for the plurality of application systems. In response to the load statistics for these individual entities having been determined, the combined tables as described in FIG. 5c can be determined for all combinations of backup servers, storage system backup pools and application systems. Thus, the best fitting combination of the storage server and storage system backup pool can be determined for the backups of the data of the application systems. It is thus possible to balance the load caused by the execution of the backups between different data processing systems.

In case of a plurality of data processing systems 100, it may be useful to implement a backup schedule improver 200 for every individual data processing system 100. Further, a central backup schedule improver 308 may be introduced as is illustrated in FIG. 6.

Figure 6:
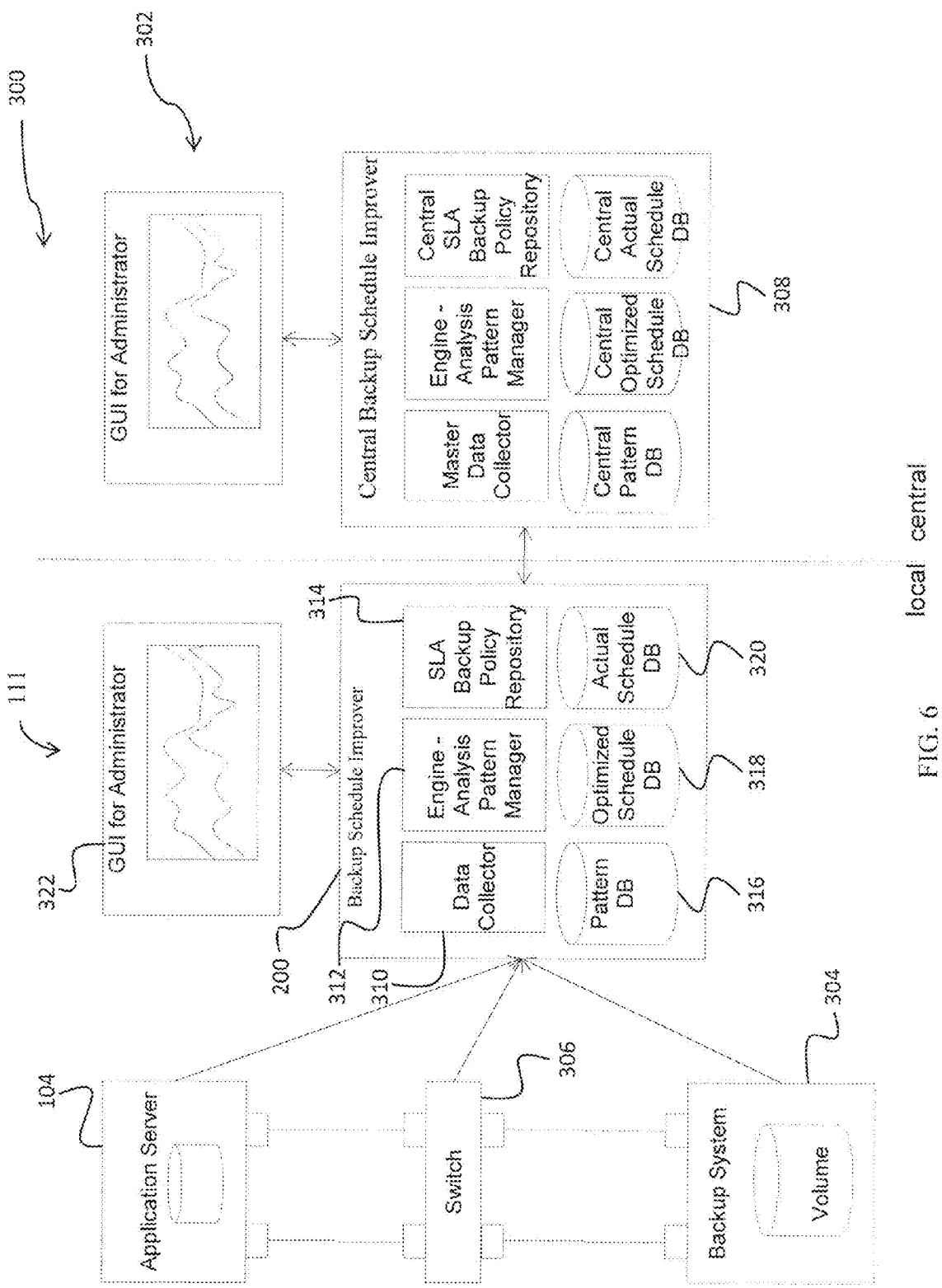
FIG. 6 depicts a schematic of a further data processing system, in accordance with embodiments of the present invention.

FIG. 6 depicts a schematic of a further data processing system 300, in accordance with embodiments of the present invention. FIG. 6 shows the data processing system 300 comprising a local data processing system 111 with a corresponding backup schedule improver 200 as well as a central master system 302 comprising a central backup schedule improver 308. In the example depicted in FIG. 6, the data processing system 111 comprises a plurality of application systems 104 and a plurality of backup systems 304 comprising backup servers 102 and storage system backup pools 106. The application servers 104 and the backup systems 304 are connected via a switch 306 which is configured to redirect the data flow during a backup between the plurality of backup systems 304 and the plurality of application servers 104.

The local backup schedule improver 200 may schedule backups in the local data processing system 111 as described above. The backup schedule improver 200 is operatively coupled to the plurality of application servers 104, the plurality of backup systems 304 and the switch 306. Further, the backup schedule improver 200 comprises a data collector 310 for collecting the utilization statistics of the application servers 104 and the backup system 304, an engine 312 for processing the collected data for determining the load patterns, and a repository 314 comprising the SLAs and backup policies for the backups to be executed in the local data processing system 111. Further the backup schedule improver 200 comprises a database 316 for the determined load patterns, a database 318 for the improved schedules and a database 320 for the actual schedules.

The backup schedule improver 200 may comprise or be connected to a graphic user interface (GUI) 322 enabling an administrator of the data processing system 111 to directly interfere with the load patterns or the backup schedules stored in the backup schedule improver 200. For example, the administrator may manually schedule backups or the administrator may manipulate the load patterns of the data processing system 111. For example, it may be planned that an application server and/or parts of one or more backup systems are meant to be updated, repaired, or may be subject to other maintenance leading to downtime of the corresponding entities. As these entities are no longer available for execution of backups, an administrator may manually set the corresponding suitability scores or load scores to a maximum value, indicating that the corresponding entity cannot be used for backup processes.

As described before, the data processing system 300 further comprises a central backup schedule improver 308. The central backup schedule improver 308 may be designed identical to the local backup schedule improver 200. However the central backup schedule improver 308 may be operatively coupled to the backup schedule improvers 200 of a plurality of local data processing systems 100 in order to retrieve the local load patterns and backup schedules, which enables the central backup schedule improver 308 to schedule and thus distribute backup processes between the data processing systems of a plurality of data processing systems 111 to enable the data processing system 300 for implementing an extensive load balancing.

Figure 7:
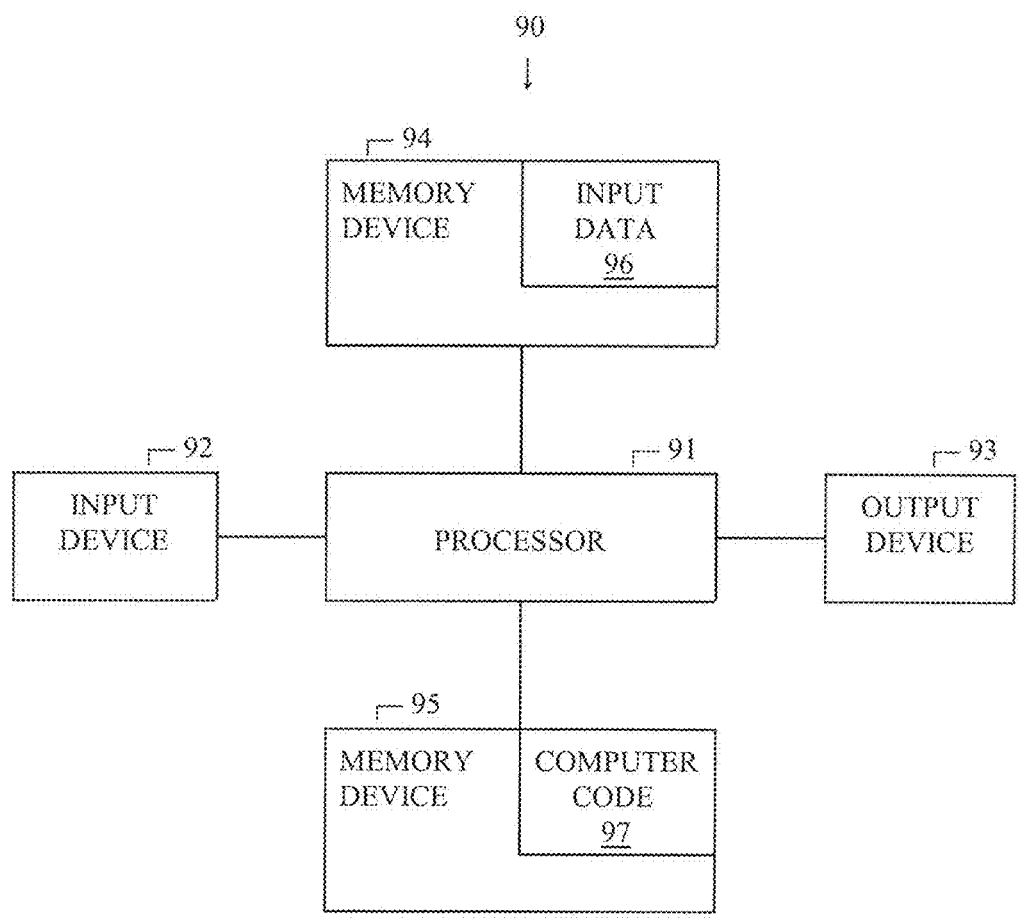
FIG. 7 illustrates a computer system used for implementing the methods of the present invention.

FIG. 7 illustrates a computer system 90 used for implementing the methods of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97 which is a computer program that comprises computer-executable instructions. The computer code 97 includes software or program instructions that may implement methods of the present invention. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 7) may be used as a computer usable storage medium (or program storage device) having a computer readable program embodied therein and/or having other data stored therein, wherein the computer readable program comprises the computer code 97. Generally, a computer program product (or, alternatively, an article of manufacture) of the computer system 90 may comprise said computer usable storage medium (or said program storage device).

Thus the present invention discloses a process for supporting, deploying and/or integrating computer infrastructure, integrating, hosting, maintaining, and deploying computer-readable code into the computer system 90, wherein the code in combination with the computer system 90 is capable of implementing the methods of the present invention.

While FIG. 7 shows the computer system 90 as a particular configuration of hardware and software, any configuration of hardware and software, as would be known to a person of ordinary skill in the art, may be utilized for the purposes stated supra in conjunction with the particular computer system 90 of FIG. 7. For example, the memory devices 94 and 95 may be portions of a single memory device rather than separate memory devices.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibres, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A computer program product of the present invention comprises one or more computer readable hardware storage devices having computer readable program code stored therein, said program code containing instructions executable by one or more processors to implement the methods of the present invention.

A computer system of the present invention comprises one or more processors, one or more memories, and one or more computer readable hardware storage devices, said one or more hardware storage device containing program code executable by the one or more processors via the one or more memories to implement the methods of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, said method comprising:
    monitoring, by one or more processors of a computer system, a capacity utilization of an application system and of a backup system of a data processing system for a predefined first period of time, said monitoring resulting in retrieving utilization statistics indicative of a capacity utilization of the application system and of the backup system;
    determining, by the one or more processors, for several time slots of a backup schedule, an application load score for the application system and a backup load score for the backup system, by applying a predefined metric to the retrieved utilization statistics of the application system and of the backup system, the application load score and the backup load score being indicative of an expected load of the application system and of the backup system, respectively, during each time slot of a plurality of time slots, each time slot being defined by a starting time and a time duration relative to the starting time;
    determining, by the one or more processors, for each time slot, a suitability score, by combining the application load score and the backup load score, the suitability score being indicative of a suitability of the application system and of the backup system in combination for execution of a backup during the time slot, the backup comprising copying data elements from the application system to the backup system;
    selecting, by the one or more processors, for the backup, a first time slot, from the plurality of time slots, whose suitability score does not exceed a predefined threshold; and
    scheduling, by the one or more processors, the backup for the first time slot for the application system and for the backup system, the backup system comprising at least one backup server and at least one backup storage pool, the at least one backup server being adapted to trigger the execution of the backup in accordance with the backup schedule, the at least one backup storage pool comprising data storage for storing the data elements of the application system during execution of the backup, the monitoring of the capacity utilization of the backup system comprising:
        monitoring a capacity utilization of the at least one backup server, thereby retrieving backup server utilization statistics,
        monitoring a capacity utilization of the at least one backup storage pool, thereby retrieving backup storage pool utilization statistics,
        said determining the backup load score comprising:
            determining a backup server load score by applying a first predefined metric to the retrieved backup server utilization statistics,
            determining a backup storage pool load score by applying a second predefined metric to the retrieved backup storage pool utilization statistics,
            determining the backup load score by combining the backup server load score and the backup storage pool load score,
        wherein said determining the backup server load score comprises computing the backup server load score as a weighted average of: a number of concurrent backup sessions, a utilization of a buffer storage of the at least one backup server, a CPU consumption, a number of disk input/output operations, and a number of network operations, and
        wherein said determining the backup storage pool load score comprises computing the backup storage pool load score as a weighted average of: the number concurrent backup sessions and a number of drives of the at least one backup storage pool in use.

2. The method of claim 1, each time slot of the backup schedule having the same duration, said backup having a duration exceeding the same duration, the method further comprising:
    defining, by the one or more processors, a set of sequences of consecutive time slots such that the sum of the durations of the time slots comprised in each sequence matches or exceeds the duration of said backup,
    determining, by the one or more processors, for the set of sequences cumulative suitability scores per sequence using the individual suitability scores of the time slots comprised in the respective sequence,
    wherein the selecting of the first time slot comprises the selecting of the sequence of time slots having a cumulative suitability score which satisfies the predefined threshold.

3. The method of claim 1, the method further comprising:
    determining, by the one or more processors, that said backup has to be scheduled repeatedly, and in response, determining, by the one or more processors, the time slot of the most recent execution of said backup, the first time slot being selected such that the time distance between the time slot of the most recent execution of said backup and the first time slot does not exceed a specified threshold.

4. The method of claim 1, the data processing system comprising a plurality of application systems and a plurality of backup systems, the determining of the application load score and the backup load score being executed individually for each of the plurality of application systems and backup systems respectively, the determination of the suitability scores being performed for each combination of application system and backup system for the time slots.

5. The method of claim 1, the application system comprising at least one application server and at least one application executed on the at least one application server, the monitoring the capacity utilization of the application system comprising:
monitoring the capacity utilization caused by execution of the at least one application on the corresponding at least one application server, thereby retrieving application server utilization statistics,
monitoring the application usage of the at least one application, thereby retrieving application usage statistics,
said determining the application load score comprising:
determining an application server load score by applying a third predefined metric to the retrieved application server utilization statistics,
determining an application usage score by applying a fourth predefined metric to the retrieved application usage statistics,
determining the application load score by combining the application server load score and the application usage score.

6. The method of claim 5, wherein said determining the application load score comprises computing the application load score as a product of the application server load score and the application usage score.

7. The method of claim 5,
wherein said determining the application server load score comprises computing the application server load score as a weighted average of: a number of application calls, a number of database transactions caused by the application, a number of concurrent user sessions of the application, and a number of currently running batch jobs of the application over a predetermined period of time, and
wherein said determining the application usage score comprises computing the application usage score as a weighted average of: a CPU consumption caused by execution of the at least one application, input/output operations of the storage medium caused by execution of the at least one application, and input/output operations of a network interface of the application server caused by the at least one application.

8. The method of claim 1, wherein said determining the suitability score comprises computing the suitability score as a sum of the application load score and the backup load score.

9. The method of claim 1, said backup being a backup of a plurality of backups, the method further comprising:
sorting, by the one or more processors, the backups in accordance with the value of a corresponding scheduling criterion, the sorting the backups resulting in a list of backups,
sorting, by the one or more processors, the time slots of the backup schedule in accordance with the suitability score of the time slots in descending order, the sorting the time slots of the backup schedule resulting in a list of time slots, and
selecting, by the one or more processors, a time slot for said backup comprising selecting the i-th time slot from the list of time slots for the i-th backup from the list of backups.

10. The method of claim 9, the scheduling criterion being the respective length of a second period of time, the list of backups comprising the backups sorted in descending order of the corresponding length of the second period of time.

11. A computer program product, comprising one or more computer readable hardware storage devices having computer readable program code stored therein, said program code containing instructions executable by one or more processors of a computer system to implement a method, said method comprising:
monitoring, by the one or more processors, a capacity utilization of an application system and of a backup system of a data processing system for a predefined first period of time, said monitoring resulting in retrieving utilization statistics indicative of a capacity utilization of the application system and of the backup system;
determining, by the one or more processors, for several time slots of a backup schedule, an application load score for the application system and a backup load score for the backup system, by applying a predefined metric to the retrieved utilization statistics of the application system and of the backup system, the application load score and the backup load score being indicative of an expected load of the application system and of the backup system, respectively, during each time slot of a plurality of time slots, each time slot being defined by a starting time and a time duration relative to the starting time;
determining, by the one or more processors, for each time slot, a suitability score, by combining the application load score and the backup load score, the suitability score being indicative of a suitability of the application system and of the backup system in combination for execution of a backup during the time slot, the backup comprising copying data elements from the application system to the backup system;
selecting, by the one or more processors, for the backup, a first time slot, from the plurality of time slots, whose suitability score does not exceed a predefined threshold; and
scheduling, by the one or more processors, the backup for the first time slot for the application system and for the backup system, the backup system comprising at least one backup server and at least one backup storage pool, the at least one backup server being adapted to trigger the execution of the backup in accordance with the backup schedule, the at least one backup storage pool comprising data storage for storing the data elements of the application system during execution of the backup, the monitoring of the capacity utilization of the backup system comprising:
monitoring a capacity utilization of the at least one backup server, thereby retrieving backup server utilization statistics,
monitoring a capacity utilization of the at least one backup storage pool, thereby retrieving backup storage pool utilization statistics,
said determining the backup load score comprising:

determining a backup server load score by applying a first predefined metric to the retrieved backup server utilization statistics, determining a backup storage pool load score by applying a second predefined metric to the retrieved backup storage pool utilization statistics, determining the backup load score by combining the backup server load score and the backup storage pool load score, wherein said determining the backup server load score comprises computing the backup server load score as a weighted average of: a number of concurrent backup sessions, a utilization of a buffer storage of the at least one backup server, a CPU consumption, a number of disk input/output operations, and a number of network operations, and wherein said determining the backup storage pool load score comprises computing the backup storage pool load score as a weighted average of: the number concurrent backup sessions and a number of drives of the at least one backup storage pool in use.

12. The computer program product of claim 11, each time slot of the backup schedule having the same duration, said backup having a duration exceeding the same duration, the method further comprising:

defining, by the one or more processors, a set of sequences of consecutive time slots such that the sum of the durations of the time slots comprised in each sequence matches or exceeds the duration of said backup, determining, by the one or more processors, for the set of sequences cumulative suitability scores per sequence using the individual suitability scores of the time slots comprised in the respective sequence, wherein the selecting of the first time slot comprises the selecting of the sequence of time slots having a cumulative suitability score which satisfies the predefined threshold.

13. The computer program product of claim 11, the application system comprising at least one application server and at least one application executed on the at least one application server, the monitoring the capacity utilization of the application system comprising:

monitoring the capacity utilization caused by execution of the at least one application on the corresponding at least one application server, thereby retrieving application server utilization statistics, monitoring the application usage of the at least one application, thereby retrieving application usage statistics, said determining the application load score comprising:
determining an application server load score by applying a third predefined metric to the retrieved application server utilization statistics, determining an application usage score by applying a fourth predefined metric to the retrieved application usage statistics, determining the application load score by combining the application server load score and the application usage score.

14. The computer program product of claim 11, said backup being a backup of a plurality of backups, the method further comprising:

sorting, by the one or more processors, the backups in accordance with the value of a corresponding scheduling criterion, the sorting the backups resulting in a list of backups, sorting, by the one or more processors, the time slots of the backup schedule in accordance with the suitability score of the time slots in descending order the sorting the time slots of the backup schedule resulting in a list of time slots, and selecting, by the one or more processors, a time slot for said backup comprising selecting the i-th time slot from the list of time slots for the i-th backup from the list of backups.

15. The computer program product of claim 14, the scheduling criterion being the respective length of a second period of time, the list of backups comprising the backups sorted in descending order of the corresponding length of the second period of time.

16. A computer system, comprising one or more processors, one or more memories, and one or more computer readable hardware storage devices, said one or more hardware storage device containing program code executable by the one or more processors via the one or more memories to implement a method, said method comprising:

monitoring, by the one or more processors, a capacity utilization of an application system and of a backup system of a data processing system for a predefined first period of time, said monitoring resulting in retrieving utilization statistics indicative of a capacity utilization of the application system and of the backup system;

determining, by the one or more processors, for several time slots of a backup schedule, an application load score for the application system and a backup load score for the backup system, by applying a predefined metric to the retrieved utilization statistics of the application system and of the backup system, the application load score and the backup load score being indicative of an expected load of the application system and of the backup system, respectively, during each time slot of a plurality of time slots, each time slot being defined by a starting time and a time duration relative to the starting time;

determining, by the one or more processors, for each time slot, a suitability score, by combining the application load score and the backup load score, the suitability score being indicative of a suitability of the application system and of the backup system in combination for execution of a backup during the time slot, the backup comprising copying data elements from the application system to the backup system;

selecting, by the one or more processors, for the backup, a first time slot, from the plurality of time slots, whose suitability score does not exceed a predefined threshold; and scheduling, by the one or more processors, the backup for the first time slot for the application system and for the backup system, the backup system comprising at least one backup server and at least one backup storage pool, the at least one backup server being adapted to trigger the execution of the backup in accordance with the backup schedule, the at least one backup storage pool comprising data storage for storing the data elements of the application system during execution of the backup, the monitoring of the capacity utilization of the backup system comprising:

monitoring a capacity utilization of the at least one backup server, thereby retrieving backup server utilization statistics, monitoring a capacity utilization of the at least one backup storage pool, thereby retrieving backup storage pool utilization statistics, said determining the backup load score comprising:

determining a backup server load score by applying a first predefined metric to the retrieved backup server utilization statistics, determining a backup storage pool load score by applying a second predefined metric to the retrieved backup storage pool utilization statistics, determining the backup load score by combining the backup server load score and the backup storage pool load score, wherein said determining the backup server load score comprises computing the backup server load score as a weighted average of: a number of concurrent backup sessions, a utilization of a buffer storage of the at least one backup server, a CPU consumption, a number of disk input/output operations, and a number of network operations, and wherein said determining the backup storage pool load score comprises computing the backup storage pool load score as a weighted average of: the number concurrent backup sessions and a number of drives of the at least one backup storage pool in use.

17. The computer system of claim 16, the application system comprising at least one application server and at least one application executed on the at least one application server, the monitoring the capacity utilization of the application system comprising:

monitoring the capacity utilization caused by execution of the at least one application on the corresponding at least one application server, thereby retrieving application server utilization statistics, monitoring the application usage of the at least one application, thereby retrieving application usage statistics, said determining the application load score comprising:

determining an application server load score by applying a third predefined metric to the retrieved application server utilization statistics, determining an application usage score by applying a fourth predefined metric to the retrieved application usage statistics, determining the application load score by combining the application server load score and the application usage score.

18. The computer system of claim 16, said backup being a backup of a plurality of backups, the method further comprising:

sorting, by the one or more processors, the backups in accordance with the value of a corresponding scheduling criterion, the sorting the backups resulting in a list of backups, sorting, by the one or more processors, the time slots of the backup schedule in accordance with the suitability score of the time slots in descending order, the sorting the time slots of the backup schedule resulting in a list of time slots, and selecting, by the one or more processors, a time slot for said backup comprising selecting the i-th time slot from the list of time slots for the i-th backup from the list of backups.

19. The computer system of claim 18, the scheduling criterion being the respective length of a second period of time, the list of backups comprising the backups sorted in descending order of the corresponding length of the second period of time.

\* \* \* \* \*